UNITED STATES PATENT OFFICE.

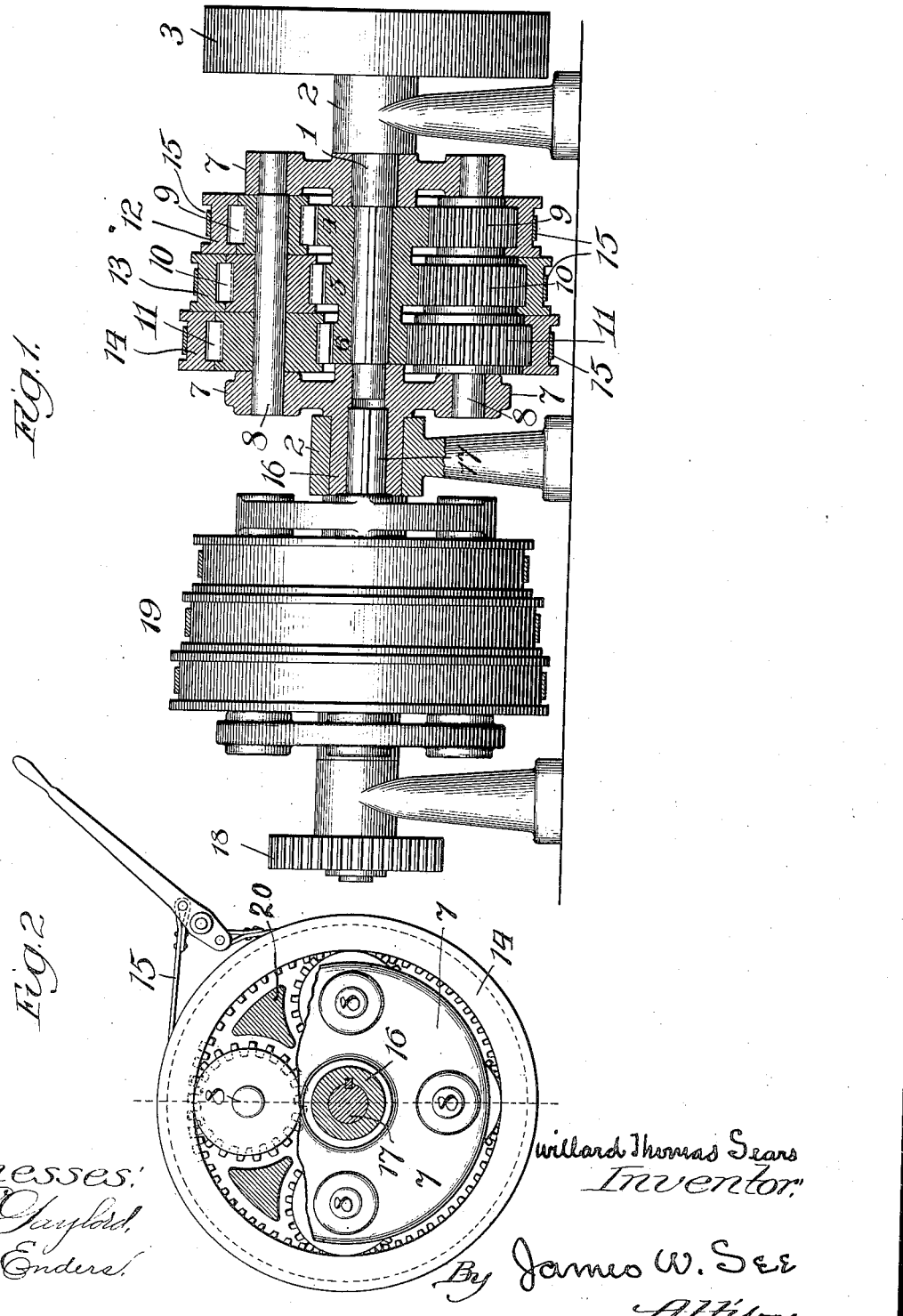

WILLARD THOMAS SEARS, OF PHILADELPHIA, PENNSYLVANIA, ASSIGNOR TO NILES-BEMENT-POND COMPANY, OF JERSEY CITY, NEW JERSEY.

VARIABLE-SPEED GEARING.

No. 812,886.      Specification of Letters Patent.      Patented Feb. 20, 1906.

Application filed April 24, 1905. Serial No. 257,149.

*To all whom it may concern:*

Be it known that I, WILLARD THOMAS SEARS, a citizen of the United States, residing at Philadelphia, Philadelphia county, Pennsylvania, (post-office address Twenty-first and Callowhill streets, Philadelphia, Pennsylvania,) have invented certain new and useful Improvements in Variable-Speed-Gearing, of which the following is a specification.

This invention, relating to improvements in variable-speed gearing, will be readily understood from the following description, taken in connection with the accompanying drawings, in which—

Figure 1 is a front elevation, part vertical section, of speed-changing gearing exemplifying my invention; and Fig. 2 is a vertical transverse section of the same.

In the drawings, 1 indicates the driving-shaft; 2, bearings; 3, a driving-pulley on the driving-shaft, exemplifying means for turning the driving-shaft at constant rate of speed; 4, 5, and 6, three diversely-sized pinions fast on the driving-shaft; 7, a pair of disks separated from each other and mounted loosely on the driving-shaft and with their connections forming a cage loose on the driving-shaft; 8, a plurality of shafts extending across between the two disks and carried by the disks parallel with the driving-shaft; 9, a pinion loose on shaft 8 and gearing with pinion 4, this pinion being half-shrouded—that is to say, shrouded to the pitch-line—there being a corresponding pinion on each of shafts 8; 10, a similar half-shrouded pinion engaging pinion 5; 11, a similar half-shrouded pinion engaging pinion 6, each of the shafts 8 carrying a set of the loose pinions; 12, an internal ring-gear engaging the pinions 9, this internal gear being half-shrouded, the bore of its shrouds engaging the periphery of the shrouds of pinions 9; 13 and 14, similar half-shrouded internal ring-gears engaging, respectively, the pinions 10 and 11 on the shafts 8; 15, an independent brake for each of the ring-gears 12, 13, and 14, and 16 the outer hub of the cage at that side of the cage opposite the driving-pulley 3.

Assume for the present that the hub 16 of the cage represents the driven member of the organization, or that member to which motion is to be imparted at selective rate of speed, and assume all the brakes to be free, so that the ring-gears are unrestrained by them. In such case the cage remains stationary and the pinions on the driving-shaft will, through the pinions on the shafts 8, cause the ring-gears to revolve idly at diverse rates of speed. There will be no transmission of motion from driver 3 to driven member 16. Now let the brake on ring-gear 14 be applied so as to hold that ring-gear against rotation. The turning of pinion 11 can no longer be satisfied by the idle turning of its ring-gear, the consequence being that the pinion rolls around in a planetary path within its ring-gear, thus enforcing rotation upon the cage and causing motion to be transmitted from the driver 3 to the driven member 16 at certain rate, dependent upon the gear ratios modified, as is well known, by the planetary action. While ring-gear 14 is thus acting as an abutment, the other two ring-gears 12 and 13 turn idly, as before. If instead of applying the brake to the ring-gear 14 it be applied to one or the other of the ring-gears 12 or 13, the restrained ring-gear will act as the abutment and the cage will have rotation enforced upon it at a rate of speed relative to that of the driver, due to the proportioning of the gearing selected for action. The gears of the three sets being diversely proportioned, it follows that three rates of speed for the driven are selectively available.

The system as thus far described provides the cage with three sets of gears appropriate for three selective sets of gears, and it is manifest that the system thus provides for selective speeds in number corresponding with the number of sets of gears provided; but by employing a plurality of the complete devices in series or tandem the number of speeds available for selection may be in excess of the number of sets of gears provided.

Continuing with the drawings, 17 indicates a shaft coupled to the hub 16 of the before-mentioned cage, 18 a gear representing the ultimate driven member, and 19 a speed-changing device like that previously described, but mounted on the shaft 17, the driven gear 18 being fast on the hub of the cage of the second speed-changing device. This second speed-changing device is like the first one and is to be similarly controlled by selective brakes. It is manifest that with driving member 3 turning at constant rate nine selective speeds can be given to the ultimate driven member 18 by applying one selected brake on each of the two systems.

The device is extremely simple and efficient, economical of construction, and admirable in many ways. The ring-gears find their support on the shrouds of the planet-pinions and little power is lost in friction. The provision of each cage with a plurality of planet-shafts with their equipments of pinions is for the purpose of rendering symmetrical the support for the ring-gears and for the purpose of equalizing the angular strain.

It is manifest that while the device has been described as providing for driving a shaft to act upon the cage as a driven member when the cage is stationary and prevented from rotation the three ring-gears turn at different rates of speed, respectively, and their diversity of speeds might be utilized if it should prove desirable. The cage should be made as rigid as practicable, so as to prevent any undue angular advance of one disk relative to its fellow disk. This rigidity of the cage may be secured independent of the planet-shafts by struts 20 rigidly uniting the two disks of a pair.

I claim as my invention—

1. In variable-speed gearing, the combination of three driven gears turning together, a cage mounted for rotation upon an axis coinciding with that of said gears, planet-shafts carried by said cage parallel with the axis of said gears, planet-gears on said shafts one engaging each of the first-mentioned gears, internal gears one engaging each of said planet-gears, means for holding said internal gears alternately against rotation, a second set of three driven gears turning with said cage, a second cage provided with planet-shafts and planet-gears coöperating with the second set of driven gears, internal gears coöperating with the gears of the second cage, and means for holding the last-mentioned internal gears alternatively against rotation, whereby a number of different speeds in excess of the number of gear ratios provided may be imparted the final driven member of the gearing.

2. In variable-speed gearing, the combination of a driving member, a driven member, and a plurality of sets of planetary gears arranged in a plurality of groups intermediate said members; whereby a number of different relative speeds of said members in excess of the number of said sets of planetary gears may be obtained.

3. The combination of a primary driving-shaft, a primary driven member, and a plurality of sets of planetary gears for imparting to said primary driven member a corresponding number of speeds relative to that of said primary driving member; a final driven member, and a plurality of sets of planetary gears intermediate said driven members, the whole serving to impart to said final driven member a number of speeds relative to that of the primary driving member in excess of the total number of said sets of planetary gears.

4. The combination of a driving member, a primary driven member, three sets of planetary gears intermediate said members, a final driven member, three sets of planetary gears intermediate said driven members, and means for bringing said sets of gears into action selectively, as desired, whereby a number of speeds in excess of the number of said sets of gears may be imparted to said final driven member.

WILLARD THOMAS SEARS.

Witnesses:
E. H. WRAY,
A. M. O'BRIEN.